(12) United States Patent
Tsuru et al.

(10) Patent No.: US 6,742,852 B2
(45) Date of Patent: Jun. 1, 2004

(54) RUBBER CRAWLER

(75) Inventors: Eiji Tsuru, Yokohama (JP); Koji Nakayama, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/181,382

(22) PCT Filed: Jan. 18, 2001

(86) PCT No.: PCT/JP01/00308

§ 371 (c)(1),
(2), (4) Date: Jul. 17, 2002

(87) PCT Pub. No.: WO01/53144

PCT Pub. Date: Jul. 26, 2001

(65) Prior Publication Data

US 2002/0195877 A1 Dec. 26, 2002

(30) Foreign Application Priority Data

Jan. 19, 2000 (JP) .......................................... 2000-9709

(51) Int. Cl.$^7$ .............................................. B62D 55/24
(52) U.S. Cl. ...................................... 305/170; 305/165
(58) Field of Search ................................ 305/165, 167, 305/170, 166

(56) References Cited

U.S. PATENT DOCUMENTS

| | | | | |
|---|---|---|---|---|
| 2,476,460 A | * | 7/1949 | Smith | |
| 2,476,828 A | * | 7/1949 | Skromme | |
| 3,498,684 A | * | 3/1970 | Hallaman | |
| 3,582,154 A | * | 6/1971 | Russ, Sr. | |
| 3,622,209 A | * | 11/1971 | Leyden | |
| 3,721,477 A | * | 3/1973 | Cooper et al. | |
| 6,079,802 A | * | 6/2000 | Nishimura et al. | 305/170 X |

FOREIGN PATENT DOCUMENTS

| JP | 11-139-361 A | 5/1999 |
|---|---|---|
| JP | 11-171061 A | 6/1999 |

OTHER PUBLICATIONS

Microfilm of the specification and drawings annexed to the request of Japanese Utility model Application No. 5193/1989 (Laid–Open No. 96379/1990) (Bridgestone Corporation) (Aug. 1, 1990).

CD–ROM of the specification and drawings annexed to the request of Japanese Utility Model Application No. 2437/1993 (Laid–Open No. 64556/1993) (The Goodyear Tire and Rubber Company) (Aug. 27, 1993).

* cited by examiner

Primary Examiner—Russell D. Stormer
(74) Attorney, Agent, or Firm—Sughrue Mion, PLLC

(57) ABSTRACT

A coreless rubber crawler which cancels the difference in the amounts of deformation strains in the main body to improve the durability and which ensures transverse rigidity to prevent coming off of wheels, wherein a peripheral main cord and a reinforcing cord disposed on an outer periphery thereof are embedded in a main body having a thickness T, wherein an embedded depth H of the cord embedded in an outermost peripheral layer of the main body, the depth being measured from an inner peripheral surface of the main body, satisfies $H \geq \tfrac{1}{2} \times T$.

1 Claim, 3 Drawing Sheets

RUBBER CRAWLER

BACKGROUND OF INVENTION

1. Field of the Invention

The present invention relates to a coreless rubber crawler having a peripheral main cord and a reinforcing cord disposed on an outer periphery thereof embedded in a main body.

2. Description of the Related Art

As a crawler belt that enables a vehicle to run on a muddy road without slipping by decreasing a grounding pressure (pressure from ground) on the road where the vehicle runs, rubber crawlers that do not damage the road have been frequently employed in recent years.

Such rubber crawlers are roughly classified into a rubber crawler having cores that are widthwise disposed in an endless rubber crawler at some intervals along its longitudinal direction to be embedded in the endless rubber crawler, and a coreless rubber crawler having only reinforcing cords embedded in an endless rubber crawler. A snowmobile, agricultural vehicle (machine) or relatively small vehicle (machine) for construction adopts mainly the latter coreless rubber crawler. FIG. 5 shows an example of the structures of the coreless rubber crawler.

In the coreless rubber crawler, a peripheral main cord 22 has been embedded in a main body 21 excluding grounding lugs 25 and guide projections for wheel rotation (or driving projections) 24 at the shallow location (about 10 mm or less) with respect to the inner peripheral surface.

Bias cords 23 are disposed in the inner or outer side of the main cord 22 (outer side in case of the figure) to enhance the transverse rigidity of the rubber crawler 21, and further a cord (layer) crossing at right angle (cord layer having a cord angle crossing with the peripheral direction at right angle) is provided.

SUMMARY OF THE INVENTION

In the coreless rubber crawler, there has been no example of studying deeply the depths of theses cords embedded in the main body.

Generally, the main cord embedded in the main body of the rubber crawler scarcely extends in the peripheral direction, and therefore the main cord constitutes a neutral line of the main body of the rubber crawler.

In case the main cord (i.e., neutral line) is embedded at a shallow location with respect to the inner periphery, a grounding portion corresponding to the outer periphery is remote from the neutral line. Therefore when the crawler is rounded (entrained) about driving wheels and idlers to conduct a rotation driving, an amount of deformation strain of the main cord is apt to increase to promote deterioration of the rubber by its use for a long period.

The object of the present invention is to provide a rubber crawler which solves the above-mentioned problems relating to the conventional coreless rubber crawler and which is capable of enhancing the durability by canceling the difference between amounts of deformation strains in the rubber main body and capable of controlling separation from the crawler of the wheels by maintaining the transverse rigidity.

The present invention is provided by a coreless rubber crawler having a peripheral main cord and a reinforcing cord disposed on an outer periphery thereof embedded in a main body having a thickness T, wherein an embedded depth H of the cord embedded in an outermost peripheral layer of the main body satisfies $H \geq \frac{1}{2} \times T$, the depth being measured from an inner peripheral surface of the main body.

Further, the invention is provided by the coreless rubber crawler wherein the main cord is embedded in the main body such that the embedded depth H of the main cord, which is measured from an inner peripheral surface of the main body, satisfies $H > \frac{1}{2} \times T$.

Furthermore, the invention is provided by the coreless rubber crawler wherein the main cord is embedded in the main body such that the embedded depth H of the main cord, which is measured from an inner peripheral surface of the main body, satisfies $H = \frac{1}{2} \times T$.

Moreover, the invention is provided by the coreless rubber crawler wherein the location of $\frac{1}{2} \times T$ is present between the main cord and the cord of the outermost layer.

DETAILED DESCRIPTION OF THE INVENTION

Figure 1:
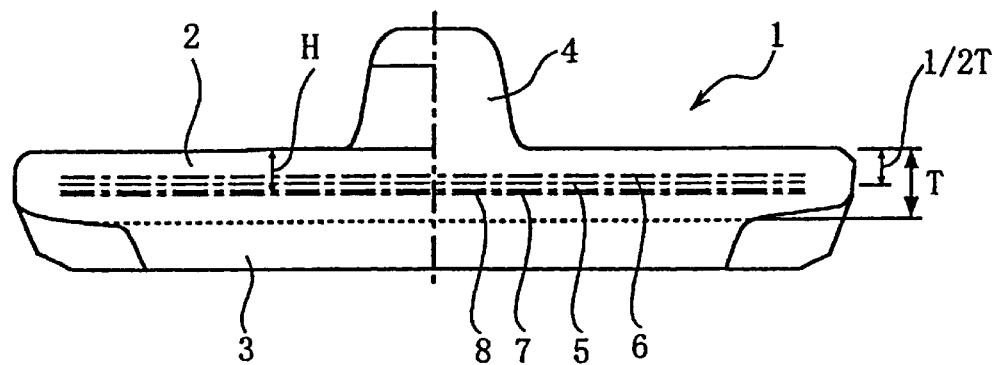
FIG. 1 is a cross section showing a first embodiment of the rubber crawler according to the invention.

The embodiments of the invention are explained based on the drawings as follows:

FIG. 1 is a cross section showing a first embodiment of the rubber crawler according to the invention and further shows a basic structure of the invention. In the rubber crawler 1, a peripheral main cord 5 comprising steel or the like and reinforcing cords 7, 8 comprising steel or the like which are disposed on an outer periphery thereof (ground side or lower side of FIG. 1) are embedded in a main body 2 having a thickness T, and an embedded depth H of the cord 8 embedded in an outermost peripheral layer of the main body satisfies $H \geq \frac{1}{2} \times T$, the depth being measured from an inner peripheral surface of the main body. In other words, the cord 8 embedded in an outermost peripheral layer is disposed at a distance not more than a half of the thickness T of the main body 2 from the grounding side.

Guide projections for wheel rotation (or driving projections) 4 are provided at prescribed intervals on the inner peripheral side of the rubber main body 2, and grounding lugs 3 are similarly provided at prescribed intervals on the outer peripheral side.

In the embodiment, a cord crossing at right angle 6, which has a cord angle crossing with the peripheral direction at right angle, is provided on the inner peripheral side of the main cord 5, whereby the transverse rigidity and cut resistance can be improved.

As mentioned above, the embodiment is characterized at least by disposing the cord 8 embedded in an outermost peripheral layer on the grounding side by a distance not more than a half of the thickness T of the main body 2. In more detail, the embedded cord is disposed relatively near to the grounding side and therefore a thickness of the rubber layer from the main cord 5 to the grounding side can be reduced whereby deformation strain of the grounding lug side which receives stretching strain can be decreased to bring about enhancement of durability. The main cord 5 constitutes a winding center when the crawler is rounded (stretched and hanged) about driving wheels and idlers.

Moreover, in the embodiment, the cord crossing at right angle 6 is provided on the inner peripheral side of the main cord 5, whereby the durability is enhanced by improvement of the transverse rigidity and cut resistance, and further the exposure of the main cord or its end (wild wire) can be prevented by ensuring the thickness of the rubber layer of the inner peripheral side.

Figure 2:
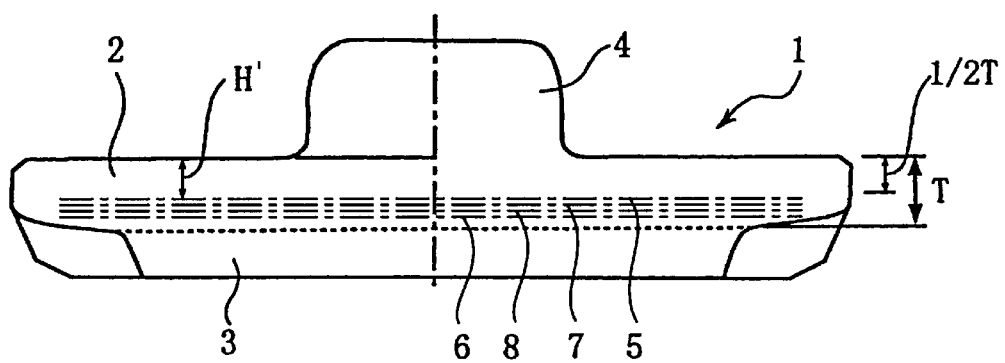
FIG. 2 is a cross section showing a second embodiment of the rubber crawler according to the invention.

FIG. 2 is a cross section showing a second embodiment of the rubber crawler according to the invention. The embodiment has a feature that the main cord 5 is embedded in the main body such that an embedded depth H' of the main cord 5 satisfies H'>½×T. In other words, the main cord 5 embedded in an innermost peripheral layer is disposed at a distance less than a half of the thickness T of the main body 2 from the grounding side.

The construction of the above-mentioned embodiment brings about a sufficient thickness of a rubber layer on the inner peripheral side, and therefore improves buffer function on running and further reduces a thickness of the rubber layer from the main cord 5 (winding center) to the grounding side to reduce deformation strain of the grounding lug side which receives stretching strain whereby the durability is enhanced. Further, the disposition of the bias cords 7, 8 on the outer peripheral side improves transverse rigidity of the rubber crawler.

Figure 3:
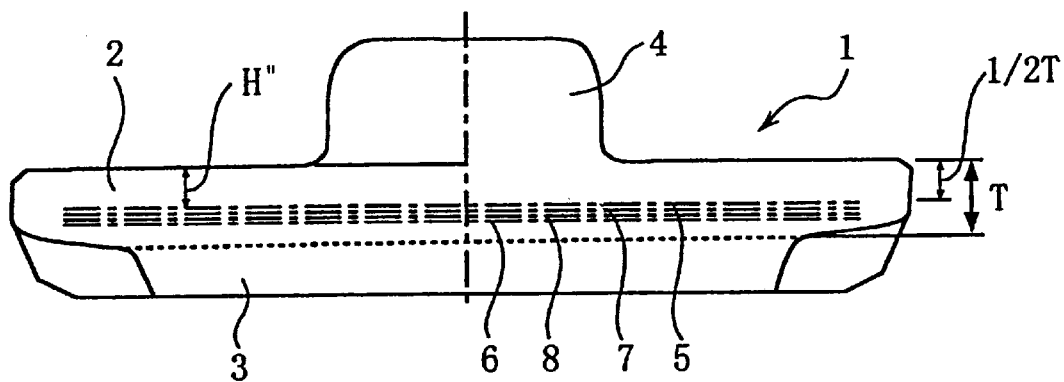
FIG. 3 is a cross section showing a third embodiment of the rubber crawler according to the invention.

FIG. 3 is a cross section showing a third embodiment of the rubber crawler according to the invention. The embodiment has a feature that the main cord 5 is embedded in the main body such that an embedded depth H" of the main cord 5 satisfies H"=½×T. In other words, the main cord 5 em-bedded in an innermost peripheral layer is disposed on a location of a half of the thickness T of the main body 2.

The construction of the above-mentioned embodiment brings about a sufficient thickness of rubber on the inner peripheral side as it is in FIG. 2, and therefore improves buffer function on running and further decreases a thickness of the rubber layer from the main cord 5 (winding center) to the grounding side to reduce deformation of the grounding lug side which receives stretching strain whereby the durability is enhanced. Further, the disposition of the bias cords 7, 8 on the outer peripheral side improves transverse rigidity of the rubber crawler, and the inner thickness of the rubber layer of the main cord 5 (winding center) is made nearly equal to the outer thickness whereby compressive and stretching strains in the inner and outer sides of the main cord are almost equal to each other to further enhance the durability.

Figure 4:
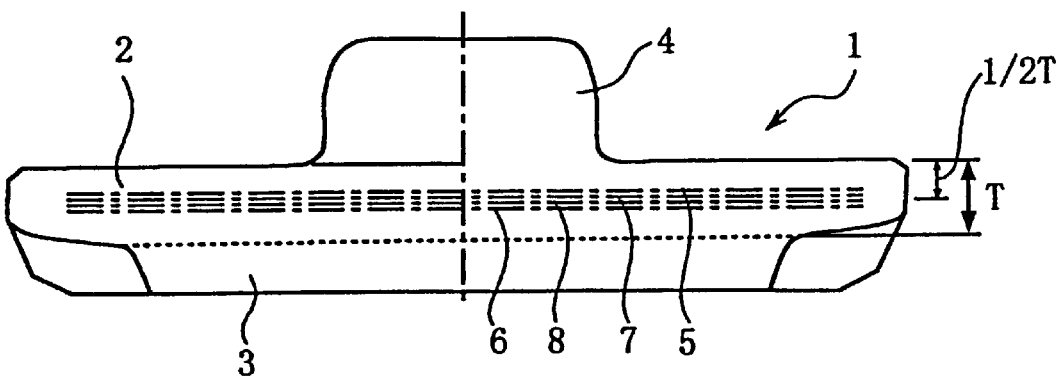
FIG. 4 is a cross section showing a fourth embodiment of the rubber crawler according to the invention.
Figure 5:
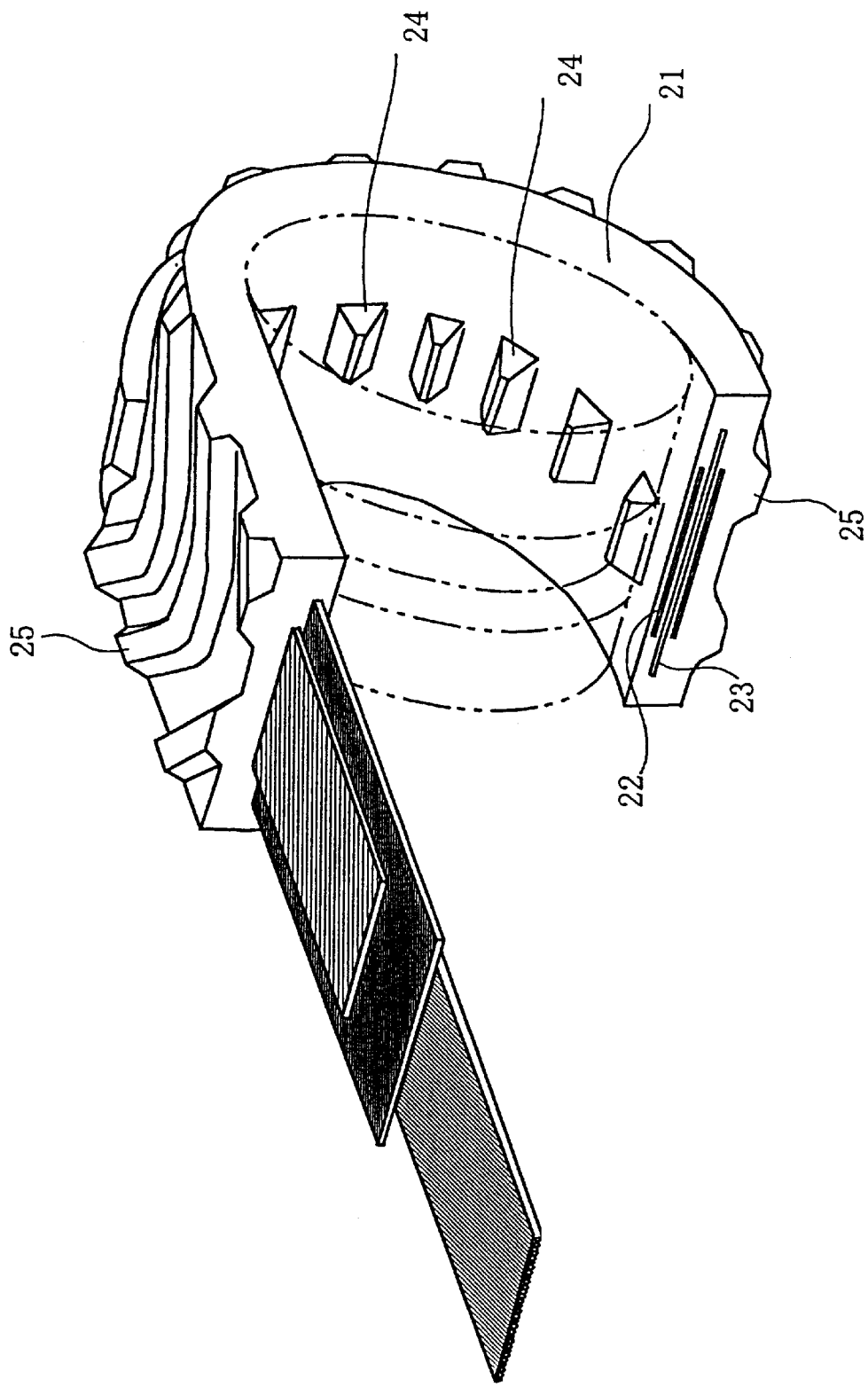
FIG. 5 is a cross section showing an example of a rubber crawler.

FIG. 4 is a cross section showing a fourth embodiment of the rubber crawler according to the invention. The embodiment has a feature that a location indicated by ½×T is present between the main cord 5 and the cord of outermost layer 6. In the embodiment shown in FIG. 4, the outermost cord 6 is a cord crossing at right angle, and bias cords 7, 8, which are disposed between the cord layer crossing at right angle 6 and the main cord 5, are provided in almost the center of the main body 2 (½ of thickness).

By the construction of the above-mentioned embodiment, a thickness of the rubber layer on the inner peripheral side can be ensured to the some extent, and therefore buffer function on running is improved and further a thickness of the rubber layer from the main cord 5 (corresponding to a winding center) to the grounding side is also decreased to reduce deformation strain of the grounding lug side whereby the durability is enhanced. Simultaneously, the locations of reinforcing layers including the main cord 5 can be raised to enhance rigidity and torsional rigidity of the inner side whereby driving wheels and idlers are effectively prevented from coming off (slipping off) from the inner peripheral of the rubber crawler 1.

Although the above description is explained as to the embodiments of the invention, the form and style of the rubber crawler including the guide projections and the grounding lugs, the form and material of each cord, the angle of the cord, and its structure to be embedded in the rubber crawler can be conveniently selected within the scope of the invention. Further, in the embodiments, the rubber layer disposed between the cords is formed from treated rubber attached to each of the cords, but may be, if necessary, the rubber layer of the main body. Furthermore, the embedded location of the cord layer crossing at right angle is not also restricted to that of each of the embodiments.

As mentioned above, the constitution of the invention lies in the coreless rubber crawler having a peripheral main cord and a reinforcing cord disposed on an outer periphery thereof embedded in a main body having a thickness T, wherein an embedded depth H of the cord embedded in an outermost peripheral layer of the main body satisfies H≧½× T, the depth being measured from an inner peripheral surface of the main body. In the constitution of the coreless rubber crawler, the cord embedded in an outermost peripheral layer is disposed at a distance not more than a half of the thickness of the main body 2 from the grounding side, and hence the embedded cord is disposed relatively near to the grounding side, whereby a thickness of the rubber layer from the main cord to the grounding side can be reduced. Further the reduction of the thickness decreases deformation strain of the grounding lug side which receives stretching strain, and consequently brings about enhancement of the durability. The above main cord corresponds to a winding center when the crawler is rounded (entrained) about driving wheels and induction wheels.

In the coreless rubber crawler wherein the main cord is embedded in the main body such that the embedded depth H' of the main cord satisfies H'>½×T, a sufficient thickness of a the rubber layer on the inner peripheral side can be obtained, and therefore buffer function on running is improved. Moreover, a thickness of the rubber layer from the main cord (winding center) to the grounding side can be reduced to decrease deformation strain of the grounding lag side which receives stretching strain, whereby the durability is enhanced. Further, the disposition of the bias cords on the outer peripheral side improves transverse rigidity of the rubber crawler.

In case the rubber crawler has a feature that the main cord is embedded in the main body such that an embedded depth H" of the main cord satisfies H"=½×T, a sufficient thickness of the rubber layer on the inner peripheral side can be obtained, and therefore buffer function on running is improved. Moreover, a thickness of the rubber layer from the main cord (winding center) to the grounding side is reduced, decreasing deformation strain of the grounding lag side which receives stretching strain, whereby the durability is enhanced. Further, the disposition of the bias cords on the outer peripheral side improves transverse rigidity of the rubber crawler, and the inner thickness of the rubber layer of the main cord (winding center) is made nearly equal to the outer thickness whereby compressive and stretching strains in the inner and outer sides of the main cord are almost equal to each other to enhance the durability.

In case the rubber crawler has a feature that a location indicated by ½×T is present between the main cord and the cord of the outermost layer, a thickness of the rubber layer on the inner peripheral side can be ensured to the some extent, and hence buffer function on running is improved. Simultaneously, a thickness of the rubber layer from the main cord (corresponding to a winding center) to the grounding side is also decreased to reduce deformation strain of the grounding lug side whereby the durability is enhanced. Further, the locations of reinforcing layers including the main cord can be raised to enhance the rigidity and torsional rigidity of the inner side whereby driving wheels and induction wheels are effectively prevented from coming off (slipping off) from the inner periphery of the rubber crawler.

Thus the invention provides the rubber crawler which cancels the difference in the amounts of deformation strains in the main body to improve the durability and which ensures transverse rigidity to prevent coming off of wheels.

What is claimed is:

1. A coreless rubber crawler having a peripheral main cord, one or more reinforcing cords and a cord crossing at a right angle, all of the reinforcing cords and the cord crossing at a right angle being disposed on an outer periphery of the main cord embedded in a main body having a thickness T, wherein the main cord is embedded in the main body such that the embedded depth H of the main cord satisfies $H > \frac{1}{2} \times T$, the depth being measured from an inner peripheral surface of the main body.

* * * * *